Oct. 23, 1928.
A. B. PARKER
1,689,173
ROD COUPLING
Filed March 17, 1924
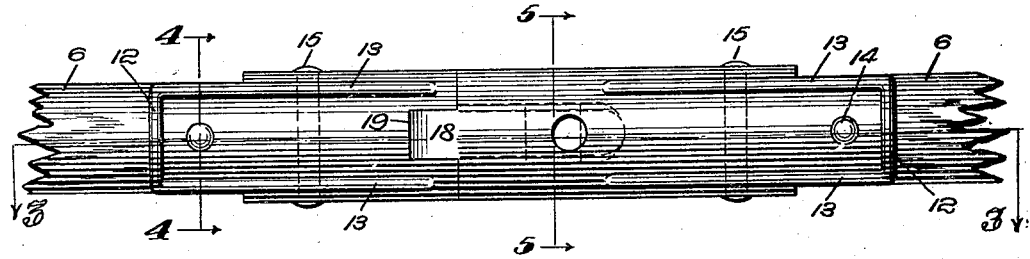
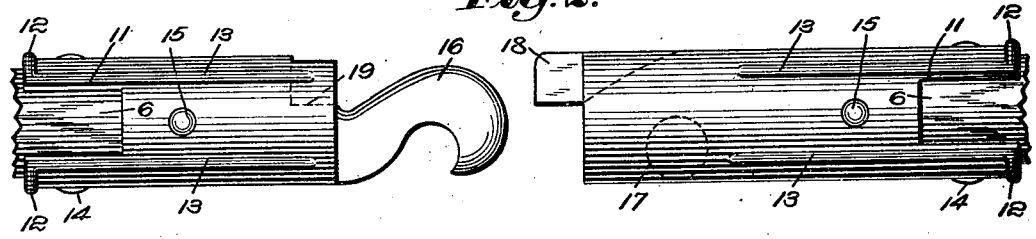
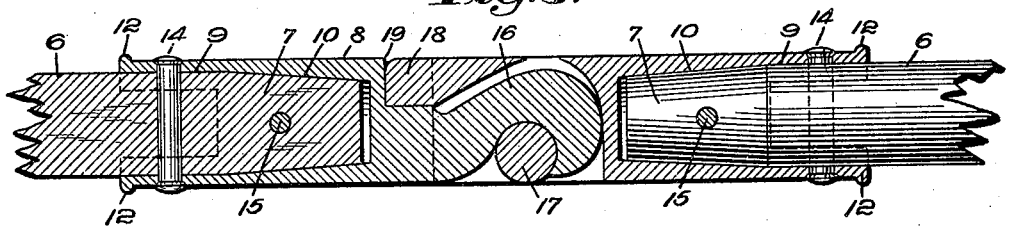
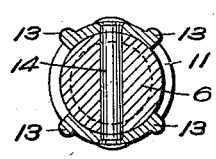
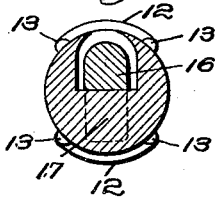
Inventor:
Alfred B. Parker,
by Emery, Booth, Janney & Varney
Attys.

Patented Oct. 23, 1928.

1,689,173

UNITED STATES PATENT OFFICE.

ALFRED B. PARKER, OF WOLLASTON, MASSACHUSETTS, ASSIGNOR TO WALDO BROS. AND BOND COMPANY, OF BOSTON, MASSACHUSETTS, A CORPORATION OF MASSACHUSETTS.

ROD COUPLING.

Application filed March 17, 1924. Serial No. 699,623.

This invention relates to a novel and improved rod coupling of the class commonly employed in connection with jointed rods for pulling electric conductors through conduits, and for similar purposes.

The invention will be best understood by reference to the following description, when taken in connection with the accompanying drawings of one specific embodiment thereof, while its scope will be more particularly pointed out in the appended claims.

In the drawings:

Fig. 1 is a plan of two rods connected to each other by a rod coupling, exemplifying the invention;

Fig. 2 is an elevation of the part shown in Fig. 1; with the coupling members disconnected from each other;

Fig. 3 is a sectional view on line 3—3 of Fig. 1;

Fig. 4 is a sectional view on line 4—4 of Fig. 1; and

Fig. 5 is a sectional view on line 5—5 of Fig. 1.

Referring to the drawings, and to the embodiment of the invention which is selected for exemplification, there are shown two rods, each presenting a cylindrical body portion 6 and a tapered terminal portion 7 (see Fig. 3). Two coupling members 8 present rod-receiving sockets having cylindrical portions 9, receiving the cylindrical body portions of the rod, and tapered portions 10 receiving the tapered terminal portions of the rods. Thus, each rod can be firmly fitted into its socket, owing to the tapered formation, while at the same time, the cylindrical formation permits the use, at the outer end of the socket, of a rod without a shoulder, heretofore employed.

Each socket member presents two lateral openings 11 (see Fig. 2) along the cylindrical portion of its socket, and two reinforcing ribs, each having an arcuate portion 12 and two longitudinal portions 13 intermediate said openings. These ribs impart great strength to the socket, yet without adding any considerable amount of weight, while the provision of the openings between the ribs contributes greatly to the lightness of the socket.

The rods are secured in place in their respective sockets by appropriate fastening elements, herein a pin 14 extending through the cylindrical portion of each rod and its socket, and a pin 15 extending through the tapered portion of each rod and its socket transversely of the pin 14. This arrangement of the pins is preferred, as the rod is not at all likely to split, as might be the case otherwise. The pin 14 not only serves as a fastening element for the rod, but it also constitutes a tie member to prevent the socket walls through which it passes from spreading. Both sets of pins are, of course, headed over at their ends.

The coupling members may be secured to each other by appropriate means, herein a hook 16 carried by one member, and engaging a pivot 17 carried by the other member, relative swinging movement of the members about the axis of the pivot being limited by a lug 18 carried by one, and received in a depression 19 presented by the other.

Having thus described one embodiment of the invention, but without limiting myself thereto, what I claim and desire by Letters Patent to secure is:

1. The combination of a rod presenting a cylindrical body portion and a tapered terminal portion; a ferrule member presenting a rod-receiving socket having a cylindrical portion receiving said cylindrical body portion and having a tapered portion receiving said tapered terminal portion, said member presenting two lateral openings along the cylindrical portion of its socket, and two reinforcing ribs each having a circumferential portion and two longitudinal portions intermediate said openings; and a fastening element extending through the cylindrical portion of said rod and its socket.

2. The combination of a rod presenting a tapered terminal portion; a ferrule member presenting a tapered socket receiving said tapered terminal portion, said member presenting two lateral openings; and spaced reinforcing ribs intermediate said openings; and a fastening element extending through said rod and through said ferrule member across said openings and between said ribs.

3. The combination of a rod; a ferrule member presenting a socket receiving said rod, said member presenting two lateral openings and reinforcing ribs extending circumferentially between said openings and longitudinally of said member; and a fastening element securing said rod in place in said socket.

4. The combination of a rod having a tapered portion, a ferrule member presenting a tapered socket which receives said tapered portion, said member having two lateral openings at the outer end of said socket, and reinforcing ribs having circumferential parts between said openings and longitudinal parts between and beyond said openings.

5. As an article of manufacture, a ferrule presenting a tapered socket and having two lateral openings at the outer end of said socket, reinforcing external ribs intermediate said openings, said ferrule having perforations intermediate said openings.

6. As an article of manufacture, a ferrule presenting a tapered socket and having two lateral openings at the outer end of said socket, reinforcing ribs intermediate and longitudinally beyond said openings, said ferrule having perforations intermediate and longitudinally beyond said openings.

In testimony whereof, I have signed my name to this specification.

ALFRED B. PARKER.